United States Patent [19]

Engel et al.

[11] 4,344,084
[45] Aug. 10, 1982

[54] VIR CORRECTION SYSTEM

[75] Inventors: Christopher M. Engel, Arlington Heights; Gopal K. Srivastava, Buffalo Grove; George J. Tzakis, Glenview, all of Ill.

[73] Assignee: Zenith Radio Corporation, Glenview, Ill.

[21] Appl. No.: 231,635

[22] Filed: Feb. 4, 1981

[51] Int. Cl.³ .................................................. H04N 9/535
[52] U.S. Cl. ................................................... 358/21 V
[58] Field of Search .................... 358/21 R, 21 V, 27, 358/28, 40

[56] References Cited

U.S. PATENT DOCUMENTS 4,215,363  7/1980  Borlaug ........................... 358/21 V
4,305,089 12/1981  Hozoya ........................... 358/21 V
4,306,247 12/1981  Tomimoto ....................... 358/21 V

*Primary Examiner*—Michael A. Masinick

[57] ABSTRACT

A VIR Correction system is disclosed for use in a system such as a color television receiver. Television signals of the type under consideration include a plurality of video lines, each line having a standard color burst and video chrominance. On line 19 of each television field, a VIR signal is transmitted which includes a VIR color burst and a VIR chrominance reference. The correction system includes an amplitude comparator for sensing the difference in amplitude between the VIR color burst and the VIR chrominance reference, and for developing an amplitude error signal indicative of the sensed difference. A phase comparator develops a phase error signal on sensing a phase difference between the VIR color burst and the VIR chrominance reference. A phase controller receives at least the standard color burst portion of the television signal and responds to the phase error signal for correcting the phase of the standard color burst. A gain controller receives at least the video chrominance portion of the television signal and responds to the amplitude error signal for correcting the amplitude of the video chrominance.

13 Claims, 9 Drawing Figures

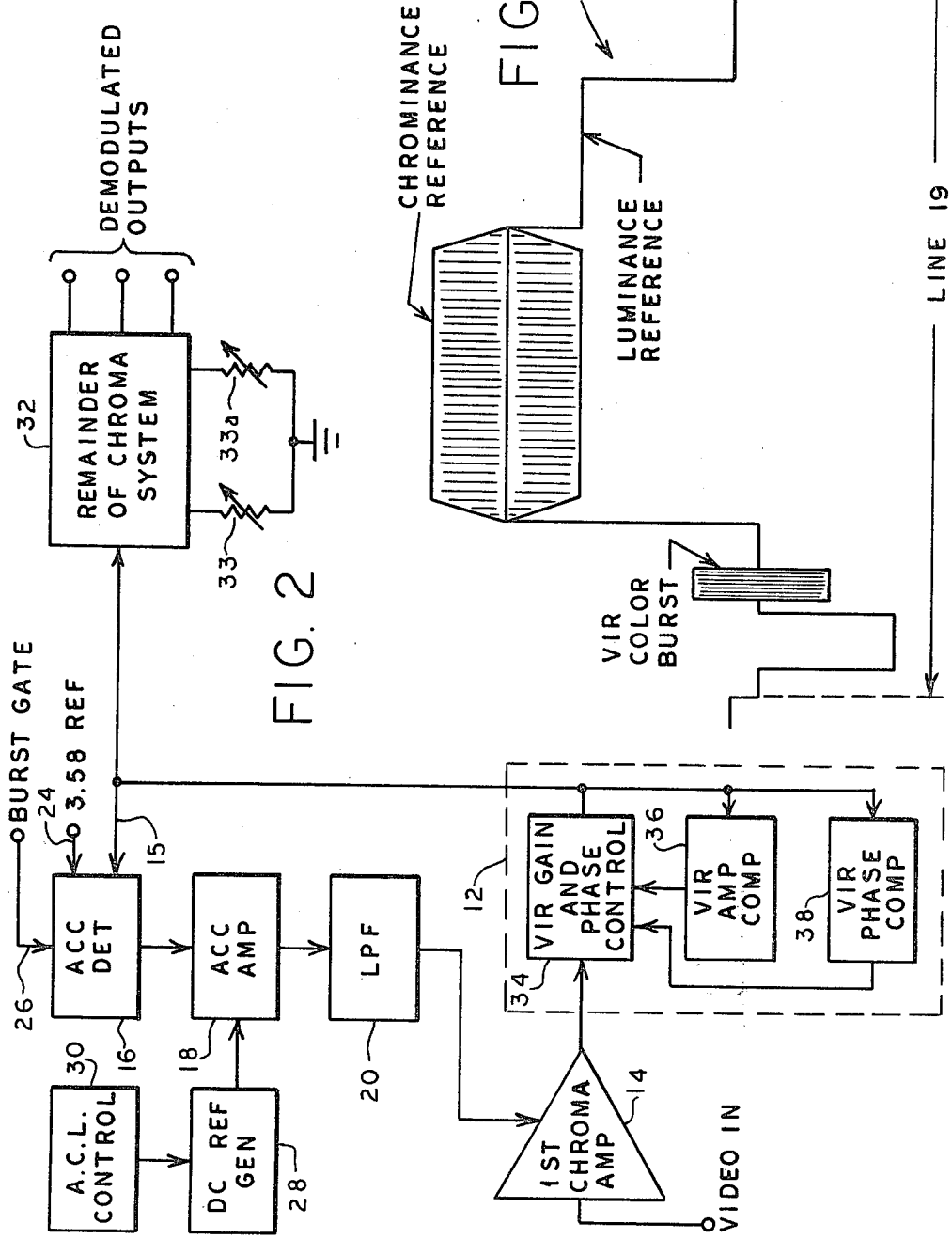

VIR CORRECTION SYSTEM

BACKGROUND OF THE INVENTION

The present invention is generally directed to improvements in color television receivers. It is particularly directed to an improved VIR (vertical interval reference) correction system for use in such receivers.

Many television broadcast signals include a so-called VIR signal on line 19 of each television field. That VIR signal includes a VIR color burst and a VIR chrominance reference signal. Some television receivers now include a correction system which uses the VIR color burst and the VIR chrominance reference to automatically adjust the amplitude and phase of the color signal developed by the receiver.

Conventional VIR correction systems compare the amplitude of the demodulated VIR chroma reference to an amplitude reference signal generated in the receiver. Any deviation in the amplitude of the demodulated signal from the amplitude reference signal results in the generation of a feedback signal. The latter signal is used to adjust the gain of one or more amplifiers which amplify the VIR chroma reference prior to its demodulation. Because those same amplifiers process the normal, i.e., non-VIR color signal, the amplitude of the color signal is automatically controlled.

To control the phase of the color signal, the correction system compares the amplitude of the demodulated VIR color burst to another locally generated reference signal, and develops another feedback signal indicative of any difference between them. The latter signal is usually fed back to the receiver's tint control to adjust the phase of the 3.58 megahertz oscillator signal and thereby adjust the hue of the demodulated color signals.

One drawback of the correction system described above is its need for two reference signals, one for an amplitude reference and one for a phase reference. Both reference signals are normally at pre-set values which can be mis-adjusted. The added expense of providing the reference signals is, of course, also undesirable.

Another drawback resides in the fact that the receiver's usual color processing circuitry must be specially designed to interface with the VIR correction system. As stated above, the conventional correction system operates on demodulated color signals and is, therefore, located "downstream" of the receiver's color signal amplifiers, automatic color gain control circuitry, tint controls and the like which are included in the color processing circuitry. This arrangement presents several problems.

For example, if the viewer attempts to increase color level by adjustment of a customer control, the correction system tends to negate such adjustment by decreasing the gain of the color processing circuitry to hold color level constant. A similar effect occurs when the viewer attempts to adjust tint. To overcome this interaction, the color processing circuitry must be defeated or gated off during the nineteenth line of each field so that the customer controls do not affect the VIR signals. Thus, the color processing circuitry must be specially designed to include a provision for such gating.

Another undesirable effect occurs when the transmitted VIR signal is terminated. Assuming that the receiver includes the usual customer controls for adjusting color level and tint, and also includes pre-set (non-customer) color level and tint controls, the pre-set set controls may be "ON" when the VIR signal terminates. In that case, the pre-set controls operate to adjust color level and tint to presumably nominal settings. If, however, the pre-set controls are "OFF" when the VIR signal terminates, then the customer controls become effective. If those customer controls are mis-adjusted (as they are likely to be when the customer has been relying on VIR correction), then the color level and tint of the television image will be incorrect.

The present invention overcomes these problems to render VIR correction a more desirable feature in color television receivers.

OBJECTS OF THE INVENTION

It is a general object of the invention to provide an improved VIR correction system for use in color television receivers.

It is a more specific object of the invention to provide a VIR correction system which does not require specially designed color processing circuitry and which overcomes the above-mentioned problems with conventional VIR correction systems.

BRIEF DESCRIPTION OF THE DRAWINGS

The objects stated above and other objects of the invention are set forth with more particularity in the following detailed description and in the accompanying drawings, of which:

FIG. 1 illustrates a standard VIR signal of the type included on the nineteenth line of each television field;

FIG. 2 shows a block diagram of the present VIR correction system and the manner in which the system interfaces with color processing circuitry in a television receiver;

DESCRIPTION OF THE PREFERRED EMBODIMENT

Figure 3:
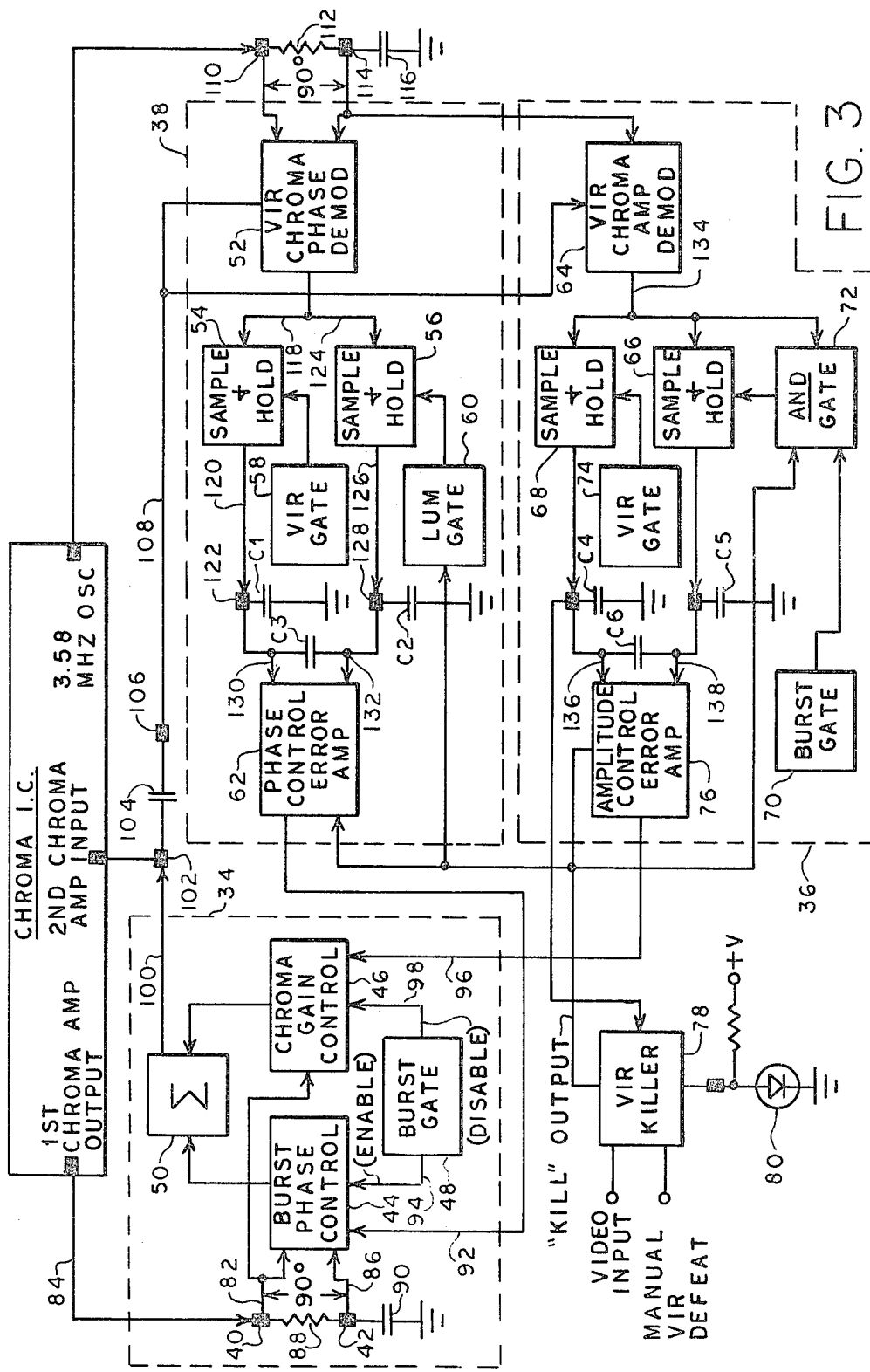
FIG. 3 is a more detailed block diagram of the correction system shown in FIG. 2.

Before describing the invention, a brief description of a conventional VIR signal will be given so that the terminology used hereinafter may be more readily understood. Referring to FIG. 1, a VIR signal 10 is shown of the type commonly transmitted on the nineteenth line of each television field. The illustrated line includes a VIR color burst of about 3.58 megahertz followed by a VIR chrominance reference of the same frequency. Usually, the VIR color burst is of the same phase and frequency as the standard color bursts which are transmitted during scan time. In addition, the amplitude of the VIR color burst is of the same amplitude as the chrominance reference. A luminance reference is also transmitted immediately following the chrominance reference.

Referring now to FIG. 2, the present VIR correction system 12 is shown along with various color processing components of a conventional color television receiver. A first chroma (chrominance) amplifier 14 conventionally receives a video input which includes the VIR signal on line 19 and the standard color bursts and chrominance information which are transmitted during the receiver's scan time. The chrominance information transmitted during scan time, i.e, the chrominance portion of the video signal, is referred to herein as "video chrominance".

The amplified output of the amplifier 14 is coupled to the VIR correction system 12, the output of which is substantially identical to its input when no VIR correction occurs. Preferably, the output of the correction system 12 is coupled via a lead 15 to an ACC (automatic color level control) system which includes an ACC detector 16, an ACC amplifier 18, and a low pass filter 20. The purpose of the ACC system is to control the gain of the amplifier 14 so that its output has a substantially constant amplitude.

The ACC detector 16 receives the output of the correction system 12, a 3.58 megahertz reference signal via a lead 24, and a burst gate via a lead 26. The detector 16 is turned on by the burst gate for detecting color bursts received via the lead 15 by means of the reference signal on lead 24. The output of the detector 16 is coupled to the ACC amplifier 18 which also receives a D.C. reference signal from a reference generator 28. Any deviation between the value of the D.C. reference and the value of the output from the detector 16 is amplified, filtered by the filter 20, and applied to the chroma amplifier 14 for controlling its gain.

Some receivers also include an ACL (automatic color limiting) feature which increases the gain of the chroma amplifier 14 so that one or more further amplifiers downstream of the amplifier 14 limit the maximum amplitude of the chrominance signal. For this purpose, an ACL control 30 is included. The control 30 changes the amplitude of the D.C. reference output by the generator 28 so that the gain of the chroma amplifier 14 is increased. When such an increase occurs, the amplitude of the VIR signal as well as the amplitude of the video chrominance and the standard bursts are all increased at the output of the amplifier 14.

The output of the VIR correction system 12 is also coupled to the remainder of the chroma system, the latter being identified by the box 32. Included in the box 32 is a second chroma amplifier, an APC system for developing a phase-controlled 3.58 megahertz oscillator signal, and demodulators for demodulating the video chrominance input to the box 32. A viewer-operable tint control 33 and a color level control 33a may also be included. In general, the correction system 12 corrects the phase of the color bursts received from the amplifier 14 so that the APC system in the box 32 may generate a correspondingly phase-corrected oscillator signal, thereby to demodulate the chrominance information along corrected axes of demodulation for correcting the tint of the color television image. In addition, the correction system 12 corrects the amplitude of the video chrominance information received from the amplifier 14 so that the amplitude of the demodulated color signals is proper.

Toward this end, the correction system 12 includes a VIR gain and phase control 34, a VIR amplitude comparator 36 and a VIR phase comparator 38. The control 34 receives at least the standard color bursts and the video chrominance output of the amplifier 14 for correcting the phase of the former and the amplitude of the latter, if needed. If no correction is required, the standard color bursts and video chrominance are coupled from the amplifier 14 to the box 32 without alteration.

The amplitude comparator 36 receives the VIR signal for sensing the amplitude difference between the VIR color burst and the VIR chrominance reference, and for applying to the control 34 an amplitude error signal indicative of the sensed difference. The control 34 responds to that error signal by correcting the amplitude of the video chrominance information received from the amplifier 14.

The phase comparator 38 receives the VIR signal for sensing any phase difference between the VIR color burst and the VIR chrominance reference and for applying, to the control 34, a phase error signal indicative of the sensed difference. In response, the control 34 alters the phase of the standard color bursts received from the chroma amplifier 14. Accordingly, the APC system in the block 32 alters the phase of the 3.58 megahertz oscillator signal and thereby alters the phase at which the video chrominance information is developed.

As shown in FIG. 2, the gain and phase control 34 preferably receives the entire output of the chroma amplifier 14, that is, the entire VIR signal, the standard color bursts, and the video chrominance information. Consequently, the phase of the VIR color burst as well as the phase of the standard color bursts are equally modified by the control 34. In addition, the amplitudes of the VIR chrominance reference and the video chrominance are equally modified. This enables the correction system 12 to be constructed as a closed loop feedback system in which the corrected output of the control 34 is applied not only to the box 32, but also as inputs to the comparators 36 and 38. With this arrangement, the comparator 36 is gated off or otherwise deselected except during intervals when it receives a VIR signal. The comparator 38 is gated off during normal scan time to ensure that it operates only on the VIR signal and not on standard color bursts and video chrominance.

The implementation of the correction system has several advantages, among which is the fact that, when no correction is required, the output of the chroma amplifier 14 passes through the control 34 unaltered. In addition, the illustrated correction system can be used with color processing circuitry which is not specially designed for use with a VIR correction system, other than having a first chroma amplifier output which can be applied directly to the correction system.

The lack of a need for specially designed color processing circuitry can be best explained by the following examples. Assuming that the ACL control 30 has become activated, the amplitudes of the standard color bursts and the video chrominance will be increased equally. The amplitudes of the VIR burst and the VIR chrominance reference will be increased by the same amount. Hence, the ratio of the VIR color burst amplitude to the VIR chrominance reference amplitude at the input to the correction system 12 does not change. Hence, the comparator 36 senses no change, and the control 34 does not alter its output. In receivers having a VIR correction system which compares the amplitude of the VIR chrominance reference to a reference generated in the receiver, increasing the amplitude of the VIR chrominance reference by operation of the ACL control 30 causes the conventional VIR correction system to lower the amplitude of the video chrominance. In other words, the conventional VIR correction system "fights" the effect of the ACL control unless the color processing circuitry is specially designed. A special design feature which is conventionally used to overcome this problem is to gate off the ACL control 30 during line nineteen so that, while the amplitude of the standard bursts and video chrominance are increased, the amplitudes of the VIR color burst and the VIR chrominance reference are not increased. Such special design considerations add an undesirable expense to the receiver.

Another advantage of the present system is the lack of interaction between the VIR correction system and the customer's color level and tint controls. Because those controls are downstream of the correction system, they will normally be properly adjusted because, when they are in circuit, they are effective to change the tint and saturation of the color image. Hence, when the VIR signal drops out of a transmitted television signal which does not require correction, the present VIR system will not be correcting and the color level and tint controls will usually be adjusted to the viewers' preference. Hence, drop out of the VIR signal does not change the tint or saturation of the reproduced television image. In addition, the present VIR correction system is "unaware" of changes in the settings of the customers' tint and color level controls. Therefore, it does not try to compensate for changes made in their settings.

Where a VIR correction system is downstream of the color level and tint controls, customer adjustment of those controls may be interpreted by the correction system as a change in the VIR signal. Consequently, the conventional VIR system tries to compensate. This problem is also generally avoided by including special circuitry to gate off the color level and tint controls during receipt of the VIR signal.

Referring now to FIG. 3, a more detailed block diagram is shown of a preferred embodiment of the VIR correction system 12 and the manner in which it may be interfaced with a chroma I.C. (integrated circuit) which includes the chroma processing circuitry shown in FIG. 2. All the illustrated components which are external of the chroma I.C. form a part of the VIR correction system 12 and are preferably constructed on another integrated circuit chip. Hence, various connections into and out of the latter chip are illustrated by rectangularly drawn input/output pins, such as pins 40 and 42. In the discussion below, the various components of the VIR correction system are first identified and related to the components shown in FIG. 2, after which a description of their operation is given.

The VIR gain and phase control 34 of FIG. 2 may take the illustrated form which is disclosed in U.S. application Ser. No. 219,104, filed Dec. 22, 1980. It is shown as including a burst phase control 44, a chroma gain control 46, a burst gate 48 for selectively enabling and disabling the controls 44 and 46, and a summer 50 for combining the outputs of the controls 44 and 46.

The VIR phase comparator 38 includes a VIR chroma phase demodulator 52, sample and hold detectors 54 and 56, a VIR gate 58 for actuating the detector 54, a luminance gate 60 for activating the detector 56, and a phase control error amplifier 62. The output of the latter device constitutes a phase error signal used by the burst phase control 44.

The VIR amplitude comparator 36 includes a VIR chroma amplitude demodulator 64, a pair of sample and hold detectors 66 and 68, a burst gate 70 and an AND gate 72 which activate the detector 66, a VIR gate 74 which activates the detector 68, and an amplitude control error amplifier 76 which generates an amplitude error signal for application to the chroma gain control 46.

The VIR correction system may also include a VIR killer circuit 78 which receives a video input to determine when the VIR signal is present, and which has a manual VIR defeat input for use when the viewer wishes to defeat the color correction system. When the killer 78 senses the presence of the VIR signal, it may actuate a light emitting diode 80 to alert the viewer to the fact that the VIR correction system is operating. Other outputs from the killer 78 are coupled to the error amplifiers 62 and 76, and to gates 60 and 72 for disabling the correction system. When such disabling occurs, the error signals input to the controls 44 and 46 are terminated so that neither phase nor amplitude correction takes place.

Referring more specifically to the burst phase control 44, that device receives the output of the first chroma amplifier via an input lead 82, the pin 40, and a lead 84 which couples the pin 40 to the output of the first chroma amplifier. Another input to the phase control 44 is via a lead 86 which is coupled to the pin 42. A resistor 88 is coupled between pins 40 and 42 and a capacitor 90 is coupled between the pin 42 and ground. The purpose of the resistor 88 and the capacitor 90 is to phase shift the signal at pin 40 so that a 90 degree phase difference is achieved between the signals on leads 82 and 86. This phase difference is used by the control 44 so that the latter device may alter the phase of the VIR color burst and the phase of the standard color burst over a range of 90 degrees in response to a phase correction signal received from the error amplifier 62 via a lead 92. The signal on the lead 82 is not substantially altered either in phase or in amplitude by the resistor 88 or the capacitor 90 so that, when no correction is required, the color bursts on lead 82 are coupled through the burst phase control circuit 44 to the summer 50 unmodified. When the lead 92 carries a phase correction signal, the standard color burst and VIR color burst carried by the lead 82 are phase altered by the phase control 44 prior to being coupled to the summer 50.

To ensure that the burst phase control 44 modifies the phase of only the VIR color burst and the standard color burst, the burst gate 48 generates a gating signal which is coupled to the phase control 44 via a lead 94 for enabling the phase control 44 only when those bursts are present. At all other times, the phase control 44 is disabled.

The chroma gain control 46 receives the signal on lead 82 and couples the VIR chrominance reference and the video chrominance portions of that signal directly to the summer 50 when no amplitude error signal is received from the error amplifier 76 via a lead 96. When an error signal is present on lead 96, the gain control 46 modifies the amplitude of video chrominance and the VIR chrominance reference received from the lead 82 and couples those modified signals to the summer 50.

The burst gate 48 couples a disable gate signal to the control 46 via a lead 98 to disable the gain control 46 during color burst intervals.

The summer 50 combines the outputs of the phase control 44 and the gain control 46 to develop a signal on the lead 100 which includes all the components which were output from the first chroma amplifier. When neither phase nor amplitude modifications are effected, the signal on the lead 100 is the same as the signal on the lead 84. When phase correction is effected, the phases of the VIR color burst and the standard color burst appear in corrected form on the lead 100. In addition, when amplitude control is effected, the VIR chrominance reference and the video chrominance on the lead 100 are in amplitude corrected form. This corrected signal on the lead 100 may be coupled out of the VIR chip at a pin 102 and coupled back to the second chroma amplifier input on the chroma I.C. The signal at the pin 102 may be coupled via a capacitor 104 back into the VIR chip at another input pin 106 from which a lead 108 carries the signal to the VIR chroma phase demodulator 52 and to the VIR chroma amplitude demodulator 64.

Before describing the operation of the demodulator 52, it should be recalled that the VIR chrominance reference is transmitted at the same phase and amplitude as the VIR color burst. In addition, the VIR color burst is transmitted at the same phase and amplitude as the standard color bursts. Hence, when the phase of the VIR chrominance reference at the output of the first chroma amplifier is the same as the phase of the VIR color burst, no phase correction should occur. It is only when there is a difference in phase between these two signals that a phase error signal is generated.

Referring now to the VIR chroma phase demodulator 52, it receives, in addition to the signal on lead 108, a 3.58 megahertz oscillator signal which is developed in the chroma I.C. and which is coupled to the demodulator 52 via an input pin 110. The signal on the pin 110 is coupled via a resistor 112 to another input pin 114, and the pin 114 is coupled to ground through a capacitor 116. The capacitor 116 and the resistor 112 are selected such that a 90 degree phase difference occurs between the signal at pin 114 and the signal across the resistor 112 in order to provide quadrature inputs to the demodulator 52.

The demodulator 52 is essentially a conventional quadrature demodulator which demodulates the signal on lead 108 along the so-called R-Y axis. Because the oscillator signal at 110 has a phase which is locked to the phase of the corrected color burst signals appearing at the input to the second chroma amplifier, and because the demodulator 52 is a quadrature detector, it will ordinarily have no output in response to color bursts received via the lead 108. That is, any change in the phase of a color burst is reflected in a corresponding change in the phase of the oscillator signal at pin 110, wherefore the demodulator 52 generates a substantially zero output when it receives either a VIR color burst or a standard color burst. When the phase of the VIR chrominance reference is the same as the phase of the VIR color burst, the demodulator 52 will also develop a zero output. However, when a phase difference exists between the VIR color burst and the VIR chrominance reference at pin 106, the demodulator 52 will develop an output indicative of that phase difference. Of course, the demodulator 52 will also develop outputs in response to the video chrominance which appears on lead 108. However, the circuitry which receives the output of the demodulator 52 is gated so as to be responsive only to demodulator outputs which are generated in response to the VIR signal.

The output of the demodulator 52 is coupled to the sample and hold detector 54 via a lead 118. In order that the detector 54 sample only signals on the lead 118 which are derived from the VIR chrominance reference, a VIR gate 58 turns on the detector 54 only during the VIR chrominance reference interval. Hence, the output of the detector 54 (at lead 120) is a signal which represents the extent to which the phase of the VIR chrominance reference differs from the phase of the VIR color burst. A capacitor C1 is coupled to the lead 120 via a pin 122 for storing on the capacitor C1 a voltage indicative of that phase difference.

The output of the demodulator 52 is also coupled to the sample and hold detector 56 via another lead 124. The luminance gate 60 applies to the detector 56 an enabling gate signal which occurs during the luminance reference interval of the VIR signal (see FIG. 1). Because the DC level of the VIR signal during the luminance reference interval is indicative of a zero value of chrominance, the sample and hold detector 56 develops at its output lead 126 a signal which represents a zero amplitude VIR chrominance reference. Such an output is equally indicative of a VIR color burst which is quadrature detected by the demodulator 52. Thus, the output of the detector 54 will be of the same value as the output of the detector 56 when the phase of the VIR chrominance reference is the same as the phase of the VIR color burst. Hence, the difference in value of the signals on leads 120 and 126 constitutes a differential signal indicative of the phase difference between the VIR color burst and the VIR chrominance reference. The signal on the lead 126 is coupled via a pin 128 to a capacitor C2 for storing the peak value of the signal detected by the detector 56. The signals stored by the capacitors C1 and C2 are coupled via leads 130 and 132 to the inputs of the phase control error amplifier 62. A filter capacitor C3 may be coupled between the leads 130 and 132 as shown.

The phase control error amplifier 62 is essentially a differential amplifier which senses the difference between the signals on leads 130 and 132 and outputs on the lead 92 a phase error signal which is indicative of that difference. In response, the phase control circuit 44 alters the phase of the VIR color burst and the standard color burst which are received via lead 82 and couples phase-corrected bursts back to the chroma I.C. via the summer 50. The A.P.C circuitry contained on the chroma I.C. responds to the phase-corrected bursts by altering the phase of the 3.58 megahertz oscillator signal in order to change the tint of the reproduced color image. The corrected phase of the oscillator signal is also fed back to the chroma phase demoulator 52 so that the demodulator and the rest of the circuitry in the phase comparator continue to develop a phase error signal until the phase of the 3.58 megahertz oscillator signal is in quadrature with the phase of the VIR color burst.

To develop an amplitude error signal, the signal on the lead 108 is coupled to the VIR chroma amplitude demodulator 64 which also receives the oscillator signal from pin 114. The demodulator 64 may be conventional and, with the inputs as shown, demodulates on an axis which is in phase with the VIR color burst. Hence, the demodulator 64 develops a maximum amplitude output on lead 134 when it receives the VIR color burst. When the demodulator 64 receives the VIR chrominance reference, it develops an output of the same magnitude in the case where the amplitude of the chrominance reference is the same as the amplitude of the VIR color burst.

The signal on the lead 134 is coupled to a sample and hold detector 68 which is gated on by a VIR gate 74. The latter gate is selected to turn on the detector 68 during the VIR chrominance reference internal, wherefore the detector 68 generates an output which is stored on a capacitor C4 and which is indicative of the amplitude of the VIR chrominance reference.

The other sample and hold detector 66 also receives the output of the demodulator 64, and it is gated on by the burst gate 70 and an AND gate 72, both of the latter gates being disclosed in U.S. application Ser. No. 232,792, filed Feb. 9, 1981. Suffice it to say at this point that the gates 70 and 72 are adapted to turn the detector 66 on during the VIR color burst interval so that the detector 66 generates an output which is stored on a capacitor C5 and which is indicative of the amplitude of the VIR color burst. The capacitors C4 and C5 are coupled via leads 136 and 138 to the inputs of the amplitude control error amplifier 76, with a filter capacitor C6 coupled between leads 136 and 138. The differential voltage between leads 136 and 138 thus represents the difference in amplitude between the VIR color burst and the VIR chrominance reference. The amplifier 76 responds to this differential voltage by generating an amplitude error signal on the lead 96 which causes the gain control 46 to modify the amplitudes of the VIR chrominance reference and the video chrominance signals until that error signal is reduced to the minimum level attainable by the gain of the feedback system. Accordingly, the lead 100 from the summer 50 carries to the second chroma amplifier a signal whose VIR color burst and standard color burst are phase corrected, if needed, and whose VIR chrominance reference and video chrominance portions are amplitude corrected, if needed.

As stated above, the demodulators 52 and 64 may be conventional, such as those commonly found in receivers having R-Y and B-Y demodulators. The sample and hold detectors 54, 56, 66 and 68 may all be of the same construction, and are preferably of the type disclosed in U.S. application Ser. No. 99,371, filed Dec. 8, 1979. The gates 58, 60 and 74 may be of conventional construction. The burst gate 70 and the AND gate 72 are constructed as described in detail hereinafter. The preferred construction of the remainder of the VIR correction system is described below, in addition to a brief description of an exemplary sample and hold detector.

Figure 4:
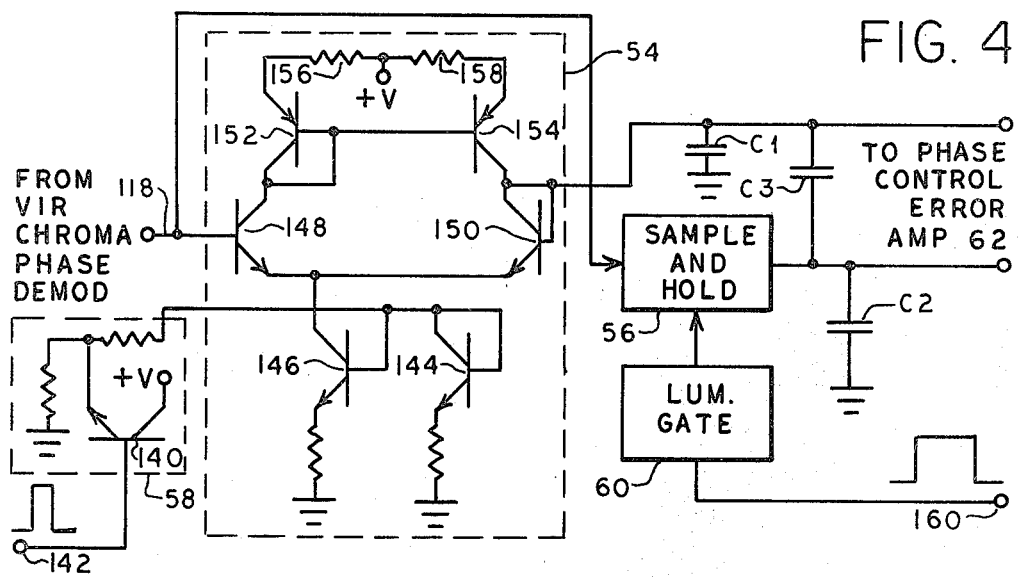
FIG. 4 illustrates a preferred embodiment of the sample and hold detector 54 shown in FIG. 3.

Referring now to FIG. 4, the preferred construction of the sample and hold detector 54 and the VIR gate 58 is shown, along with a block diagram representation of the sample and hold detector 56 and the luminance gate 60. The detector 56 and the luminance gate 60 may be constructed similarly to the detector 54 and the gate 58, respectively.

The gate 58 includes a transistor 140 which receives at its base input 142 a positive going pulse which occurs during the VIR chrominance reference interval on line 19. The occurrence of the pulse at input 142 turns the transistor 140 on to supply operating current to the sample and hold detector 54. The detector 54 includes NPN transistors 144, 146, 148 and 150, and PNP transistors 152 and 154. The transistors 144 and 146 operate to develop a current supply for the differential amplifier comprising transistors 148 and 150 when turned on by the transistor 140. The transistors 152 and 154 constitute a current mirror for causing the capacitor C1 to charge to the value of the signal applied to the base of transistor 148. The input at the base of the latter transistor is taken from the VIR chroma phase demodulator 52 via the lead 118.

To briefly describe the operation of the detector 54, it will be assumed that the voltage on the lead 118 is more positive than the voltage on the capacitor C1. In this condition, the collector current of the transistor 148 is substantially of the same value as the current developed by the transistor 146 during the VIR chrominance reference interval. The transistor 152 conducts a substantially equal current in its collector and through its emitter resistor 156. Because the transistors 152 and 154 and their respective emitter resistors 156 and 158 are matched, the transistor 154 responds to the operating condition of the transistor 152 by developing a collector current which is substantially equal to the current carried by the transistor 152. The transistor 150 is off, wherefore the current carried by transistor 154 is used to charge the capacitor C1. When the charge on the capacitor C1 is substantially equal to the level of voltage on the lead 118, the transistor 150 conducts and carries one-half the amount of current developed by the transistor 146. Thus, the capacitor C1 has no path to discharge and retains a voltage level which is substantially equal to the peak value of the voltage on the lead 118.

As stated previously, the voltage on the capacitor C1 is coupled to the phase control error amplifier 62 for comparison with the voltage developed by the sample and hold detector 56. The latter device may be constructed similarly to the detector 54 and is turned on by the luminance gate 60 which receives the pulse at an input 160. That pulse occurs during the luminance reference interval on line 19.

Figure 5:
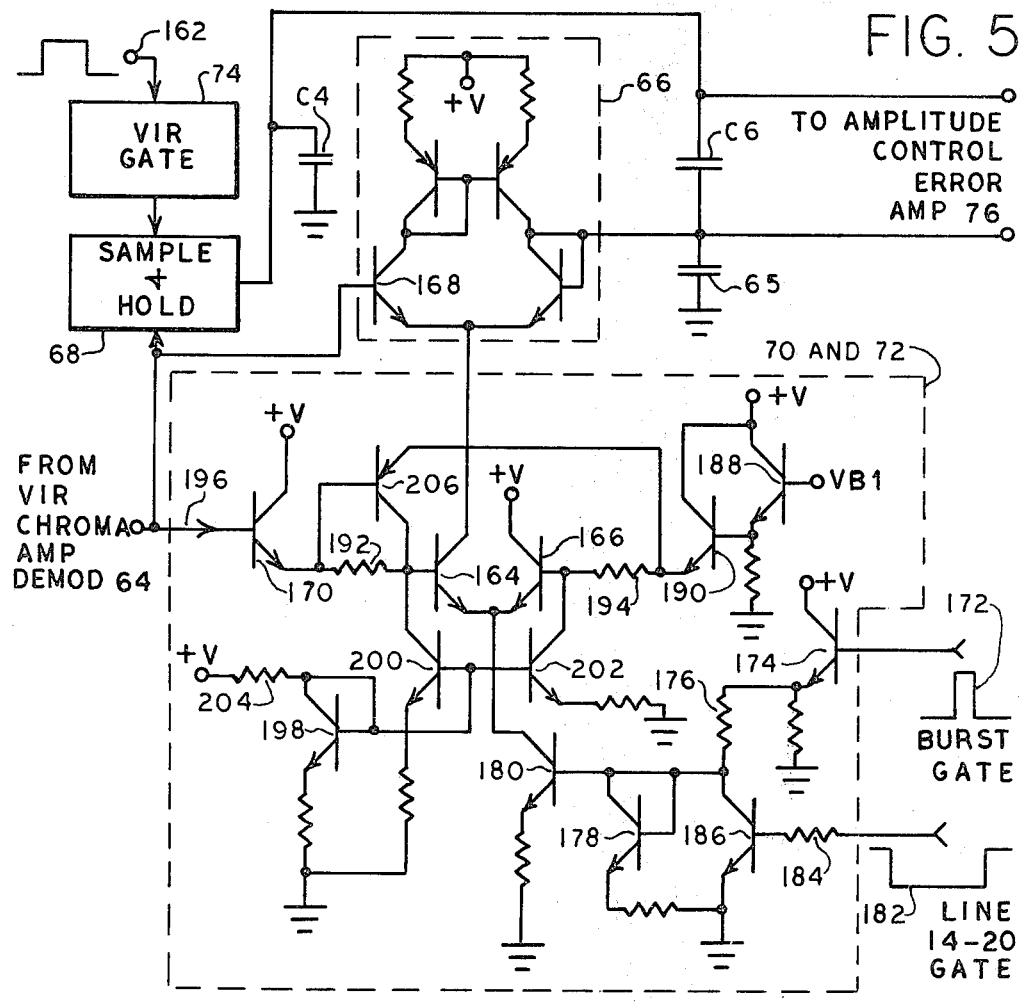
FIG. 5 illustrates a preferred embodiment of the sample and hold detector 66 of FIG. 3, including the gating circuitry thereof.

Referring now to FIG. 5, the preferred construction of the sample and hold detector 66, the burst gate 70, the AND gate 72 are shown. The sample and hold detector 68 and the VIR gate 74 are also shown to illustrate how the outputs of detectors 68 and 66 are coupled together. The VIR gate 74 receives, at an input 162, a positive going pulse which occurs during the VIR chrominance reference interval for turning on the sample and hold detector 68 during that interval. Consequently, the detector 68 develops on the capacitor C4 a voltage representative of the amplitude of the VIR chrominance reference signal. As stated above, the voltage on the capacitor C4 is coupled to the amplitude control error amplifier 76. The other input to the amplifier 76 is from the sample and hold detector 66 which develops on the capacitor C5 a voltage indicative of the amplitude of the VIR color burst.

Before describing the operation of the detector 66, the burst gate 70 and the AND gate 72, several important aspects of burst gating should be understood. Because the sample and hold detectors used herein are relatively fast, it is important that they be gated on only when the signal to be sampled actually occurs. For example, the detector 66 is designed to sample color bursts. Therefore, it should be turned on only during the color burst interval and turned off immediately thereafter. If the detector remains on after a color burst has terminated, the capacitor C5 will discharge or charge to whatever voltage level follows the color burst. In addition, the color burst to be sampled will not ordinarily rise immediately to its peak value but will increase to that value over some short but measurable time. Because it is preferred that detector 66 sample the peak value of the color burst, it is desired that the detector 66 be turned on for only a short interval during which the color burst is at its peak value.

Yet another aspect to consider in the design of the detector 66 is the very short duration of the color burst, typically about 2.7 microseconds. In such a short duration, it is possible that the capacitor C5 may not become fully charged to the peak value of the color burst. This is particularly true where, as here, the detector 66 uses an integrated PNP transistor to charge the capacitor C5. For this reason, the detector 66 is enabled not only during the color burst interval on line 19, but also during the intervals associated with standard color bursts on lines 14–18 and 20. Because the amplitudes of the standard color bursts on those lines are transmitted at the same amplitude as the VIR color burst on line 19, the detector 66 will operate as if it were detecting seven consecutive VIR color bursts rather than one VIR color burst and six standard color bursts.

Figure 6:
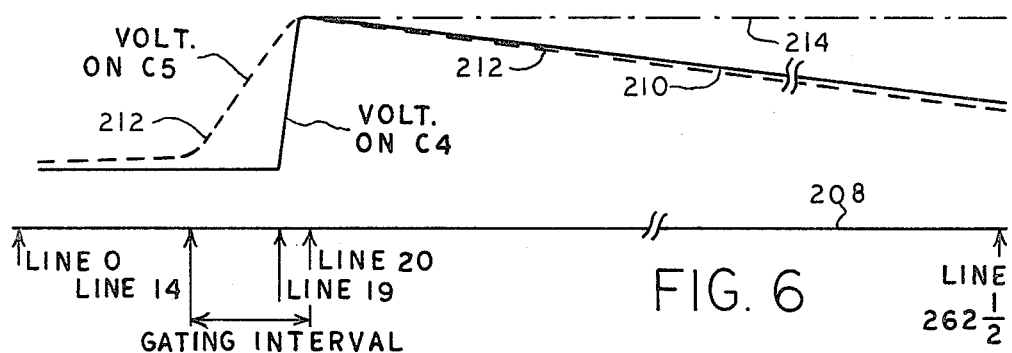
FIG. 6 illustrates waveforms useful in explaining the operation of the sample and hold detectors 66 and 68.

To illustrate the effect of enabling the detector 66 during the burst intervals associated with lines 14–20, reference is made to FIG. 6. The line 208 illustrates the time interval associated with one television field, beginning with line zero and ending with line 262 ½. At line 19, the sample and hold detector 68 is enabled for sampling the VIR chrominance reference signal to charge the capacitor C4, as shown by the solid line 210. Because the VIR chrominance reference signal has a relatively long duration, the capacitor C4 becomes fully charged during line 19 and thereafter discharges slowly.

Because of the relatively short duration of the color bursts, the capacitor C5 does not become fully charged during any one line. As shown by the dashed line 212, the voltage on the capacitor C5 begins increasing during line 14 and steadily increases to the point where it is fully charged during line 20. It then begins discharging at a rate which is substantially equal to the rate of discharge of the capacitor C4. Hence, even though the voltages on capacitors C4 and C5 discharge, their voltage differential remains substantially constant so that the amplitude control error amplifier 76 is not supplied with an incorrect error signal as the capacitors discharge.

If the detector 66 had been gated on during each line of the television field for sampling each standard color burst in addition to the VIR color burst, the voltage on the capacitor C5 would remain high as indicated by the line 214, thus preventing the capacitor C5 from discharging at the rate of discharge of the capacitor C4. Consequently, a large differential error would occur between the input to the control amplifier 76. This undesirable effect is avoided by fully charging the capacitors C4 and C5 and then permitting them to begin their discharge at approximately the same time. In the illustrated embodiment, the capacitor C5 begins its discharge one line later than does the capacitor C4. However, this difference in the time from which discharge begins is not substantial and has an unnoticeable effect on the operation of the control error amplifier 76.

Returning to FIG. 5, the detector 66 operates in the previously described manner of the sample and hold detector 54. Its sampling time is determined by the conduction time of a transistor 164 which is emitter coupled with another transistor 166 to form a differential amplifier. Thus, whenever the transistor 164 conducts, it supplies operating current to the detector 66 so that sampling may be achieved. The signal to be sampled, that is, the output of the VIR chroma amplitude demodulator 64, is coupled to the base of the transistor 168 which forms one-half of the differential amplifier in the detector 66. The signal applied to the base of the transistor 168 is also applied to the base of another transistor 170 which forms part of the gating circuitry for the detector 66.

To turn the gating circuitry on, a conventional flyback-derived burst gate 172 is applied to the base of a transistor 174. The resultant positive voltage increase at the emitter of the transistor 174 is coupled via a resistor 176 to the bases of transistors 178 and 180. Were only the burst gate 172 applied to the illustrated gating circuitry, the transistor 180 would be turned on during each burst interval for supplying operating current to the transistors 164 and 166 for effecting burst sampling. To restrict that operating current to lines 14–20, a negative-going pulse 182 is applied via a resistor 184 to the base of another transistor 186. The pulse 182 is selected to have a duration which begins at line 14 and which ends at line 20 for turning the transistor 186 off during that interval. Outside the time interval associated with lines 14–20, the transistor 186 is held on. Hence, when the transistor 186 is on, it grounds the base of the transistor 180 to prevent conduction by the latter transistor. When the transistor 186 is turned off, the transistor 180 conducts in response to the burst gate 172 which is applied to the transistor 174. With this arrangement, the transistor 180 develops collector current pulses which occur during each burst gate interval of lines 14–20.

As stated above, the burst gate 172 is a conventional flyback-derived pulse. Such pulses normally have a duration of from 4 to 5 microseconds, whereas the actual interval of the color burst which is to be sampled has a duration of only about 2.7 microseconds. To reduce the interval during which the gating circuitry enables the detector 66, the transistors 164 and 166 are given a D.C. offset which causes the transisor 164 to be conductive only for a short interval during the 4 to 5 microsecond interval associated with the burst gate 172.

The normal or non-offset bias for the transistors 164 and 166 is developed by transistors 170 and 190, and by resistors 192 and 194. The base of the transistor 170 receives a D.C. bias via a lead 196 which also carries the demodulated signal from the chroma amplitude demodulator 64. That D.C. bias and the A.D. demodulation components thereon are coupled via the emitter of the transistor 170 through the resistor 192 to the base of the transistor 164. The base of the transistor 188 receives a D.C. bias voltage indicated as VB1. The emitter of the transistor 188 is coupled to the base of the transistor 190 and the bias at the emitter of that transistor is coupled via the resistor 194 to the base of the transistor 166. The value of the bias voltage VB1 is selected such that the voltages at the emitters of transistors 190 and 170 are equal. Were this the only biasing circuitry for transistors 164 and 166, the latter transistors would be equally biased so that the transistor 164 would conduct pulses of current for enabling the detector 66 during the entire interval associated with the burst gate 172. To reduce the interval for which the transistor 164 conducts, an offset bias is applied so that the transistor 164 conducts for a shorter interval than that normally associated with the burst gate 172.

Toward this end, an offset voltage is derived by means of transistors 198, 200 and 202, and by selecting the resistor 192 to have a greater value than the resistor 194. Specifically, the collector of the transistor 198 is coupled via a resistor 204 to a positive voltage supply, with the base of the transistor 198 coupled to its collector. This establishes a predetermined current through the transistor 198. The bases of transistors 200 and 202 are also connected to the base of the transistor 198, wherefore each of the latter transistors mirrors a current in its collector which is substantially equal to the current carried by the transistor 198. Because the resistor 192 is greater in value than the resistor 194, a relatively large voltage drop occurs across it due to the collector current of transistor 200, whereas a relatively smaller voltage drop occurs across the resistor 194. Consequently, the voltage on the base of the transistor 166 is higher than the voltage on the base of the transistor 164, thereby rendering the transistor 164 non-conductive for the duration of the burst gate 172 except when it receives a demodulation signal whose amplitude is sufficient to turn it on.

Because the pulses of current developed in the collector of transistor 180 occur only during the burst gate interval, the transistor 164 can be turned on only when it receives, via the lead 196, the transistor 170, and the resistor 192, a demodulated burst whose amplitude is sufficient to raise the bias on the transistor 164 higher than the bias on the transistor 166. In practice, the various biasing resistors are selected so that a burst gate amplitude of approximately 400 millivolts is sufficient to turn the transistor 164 on. Thus, the transistor 164 will be rendered conductive for approximately two microseconds during each of the color burst intervals associated with lines 14–20. At all other times, the transistor 164 remains off. Consequently, the detector 66 is conditioned to sample only the peaks of the demodulated color burst which it receives via the lead 196 so that the capacitor C5 stores a voltage which is truly representative of the peak value of the color bursts.

Another consideration which must be taken into account in a burst gating scheme is the effect which noise has on the output of the detector. Typically, a noise impulse which occurs during the burst interval will produce both a negative-going and a positive-going noise spike on the lead 196. The positive-going noise spike on lead 196 will be coupled to the detector 66 as well as to the burst gating circuitry. The latter circuitry will be turned on to enable the detector 66 to sample the positive-going spike. Since the detector 66 detects the positive-going portion of a noise impulse, it is preferred that it also be responsive to the accompanying negative-going spike so that, by sampling both the positive-going spike and the negative-going spike, the net effect on the capacitor C5 will be to average out the effects of the noise impulse. To do this, the detector gating circuitry includes means for insuring that the detector 66 is turned on for noise spikes in either direction.

Toward this end, a PNP transistor 206 is coupled via its base to the emitter of transistor 170, via its collector to the base of the transistor 164, and via its emitter to the emitter of the transistor 190. As previously stated, the bias voltage VB1 is selected such that the voltages at the emitters of transistors 170 and 190 are equal. Consequently, the transistor 206 will normally be off and not affect circuit operation. However, when a negative-going noise spike occurs on the lead 196, the voltage at the emitter of the transistor 170 will be driven correspondingly negative. Consequently, the transistor 206 will be driven on to inject a current at the base of the transistor 164. The latter transistor is then turned on so that the detector 66 can sample the negative-going noise spike. Because the transistor 164 will be turned on when a positive-going noise spike occurs, the detector 66 is enabled for sampling during positive-going and negative-going noise spikes so that the average effect of the noise spikes is reduced to nearly zero.

Figure 7:
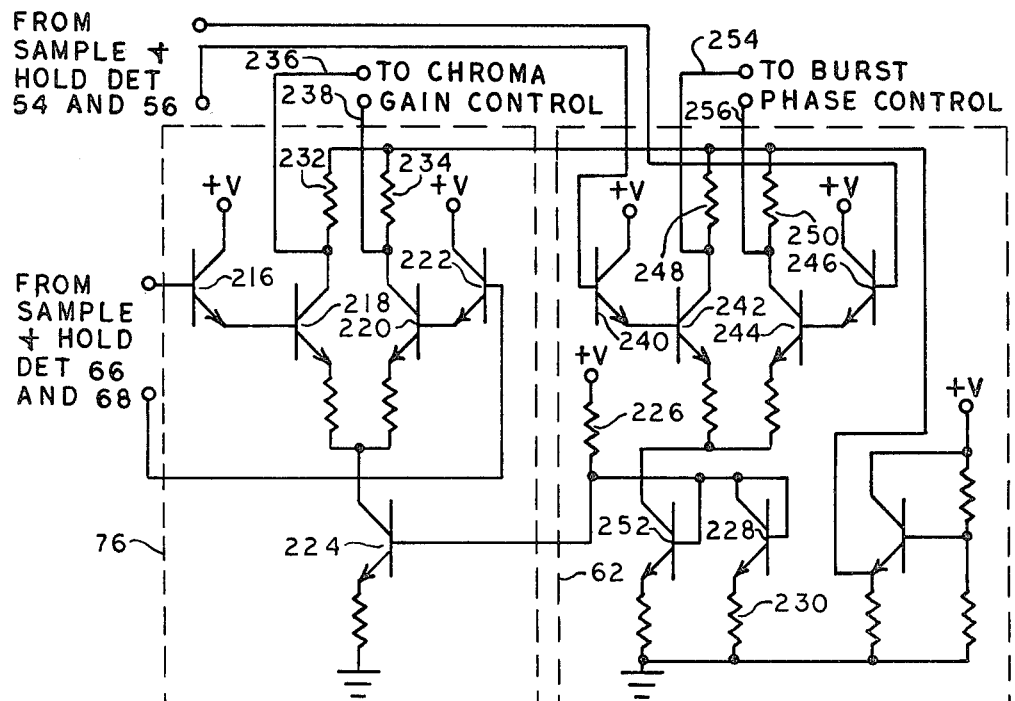
FIG. 7 shows preferred embodiments of the phase control error amplifier and the amplitude control error amplifier of FIG. 3.

Referring now to FIG. 7, the preferred construction is shown of the phase control error amplifier 62 and the amplitude control error amplifier 76. The amplifier 76 includes transistors 216, 218, 220 and 222 which are interconnected as a conventional differential amplifier whose operating current is derived from another transistor 224. The base of the transistor 224 is biased by coupling it to a resistor 226, one end of which is coupled to a positive voltage supply and the other end of which is coupled to ground via a diode-connected transistor 228 and a resistor 230. The signal inputs to the amplifier 76 are received from the sample and hold detectors 66 and 68 and they are applied to the bases of transistors 216 and 222. The transistors 216 through 222 operate linearly to develop a differential amplitude error signal between load resistors 232 and 234. That error signal is coupled via leads 236 and 238 to the input of the chroma gain control 46.

The phase control error amplifier 62 is constructed similarly to the amplifier 76. The amplifier 62 includes transistors 240, 242, 244 and 246 interconnected as a differential amplifier with load resistors 248 and 250. Operating current for the differential amplifier is supplied via the collector of a transistor 252 which is biased by the same circuitry which biased the transistor 224. The signal input to this amplifier is received from the sample and hold detectors 54 and 56 and is applied to the bases of transistors 240 and 246. The amplified signals developed across the load resistors 248 and 250 constitute the phase error signal which is coupled to the burst phase control 44 via leads 254 and 256.

Figure 9:
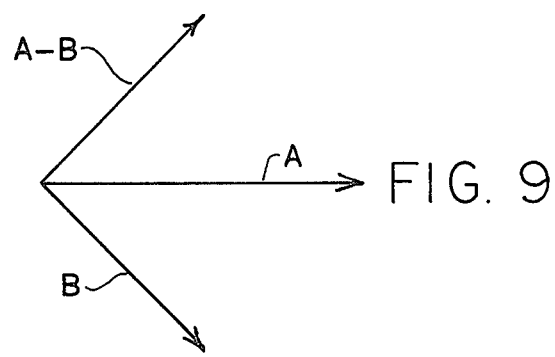
FIG. 9 is a vector diagram useful in explaining the operation of the burst phase control shown in FIG. 8.
Figure 8:
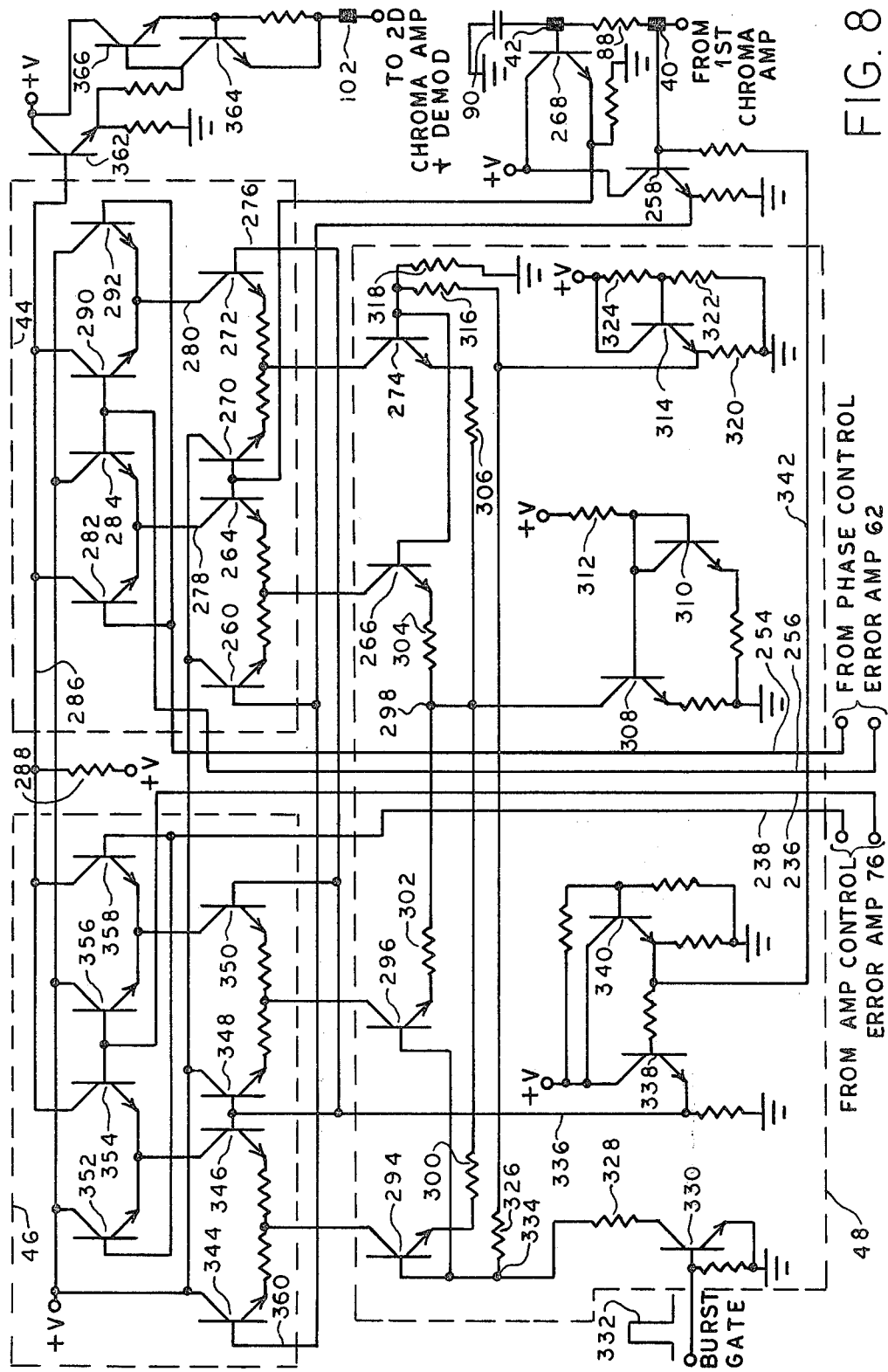
FIG. 8 shows preferred embodiments of the burst phase control, the chroma gain control and the burst gate of FIG. 3.

Referring now to FIG. 8, a detailed circuit diagram is shown of the preferred embodiments of the burst phase control 44, the chroma gain control 46, the burst gate 48, and the summer 50. Referring first to the burst phase control 44, one of its inputs is received from the first chroma amplifier at pin 40. The other input to the control 44 is at pin 42 at which a phase shifted version of the signal at pin 40 exists. To explain the nature of the signals at pins 40 and 42 and the reason for the phase shifting which occurs there, reference is made briefly to FIG. 9. In this Figure, a Vector A of arbitrary phase is shown, and it is assumed that the signal received at pin 40 is represented by the vector A. The signal at pin 42, the voltage across the capacitor 90, is represented by the vector B. Another vector, indicated as A-B, which appears across the resistor 88, is applied along with the burst phase signal vector B to control 44 so that the output of the control 44 may be varied over a 90° range which extends between the vector B and the vector A-B. As is described in more detail below, the output of the control 44 is of the phase of vector A when no phase error signal is received. Hence, the output of this device is of the same phase as its input when no correction is to be made to the phase of the color burst.

Referring again to FIG. 8, the signal represented by the vector A is coupled from pin 40 via a transistor 258 to the base of another transistor 260. This transistor is interconnected with another transistor 264 as a differential amplifier whose operating current is received from a transistor 266. The signal at pin 42 (vector B) is coupled via a transistor 268 to the base of transistor 264, and also to the base of another transistor 270. The latter transistor is interconnected as shown with a transistor 272 to form another differential amplifier which receives its operating current from a transistor 274. The base of the transistor 272 does not receive a signal voltage but it does receive a D.C. bias voltage from the burst gate circuitry 48 via a lead 276. The collectors of transistors 260 and 270 are coupled to a positive voltage source, thus shunting the signals they carry from further use. With this arrangement, the collector lead 278 of the transistor 264 carries a signal representative of the vector A-B and the collector lead 280 of the transistor 272 carries a signal representative of the vector B.

The signal carried by the lead 278 is coupled to another differential amplifier comprising transistors 282 and 284, the collector of the latter transistor being coupled to a positive voltage source. The collector of the transistor 282 is coupled via a lead 286 to a load resistor 288.

The signal carried by the lead 280 is coupled to another differential amplifier comprising transistors 290 and 282, the collector of the latter transistor being connected to the positive voltage source and the collector of the transistor 290 being coupled to the load resistor 288. As is described in more detail below, the conduction levels of transistors 282, 284, 290, and 292 are varied so as to create a phase corrected color burst signal across the load resistor 288 in response to the phase error signal generated by the phase control error amplifier 62.

One-half of the phase error signal is coupled via a lead 254 to the bases of transistors 282 and 292. The other half of that signal is coupled via a lead 256 to the bases of transistors 284 and 290. Thus, when no differential voltage exists between the leads 254 and 256, the transistors 282 and 290 conduct equally. Hence, equal amplitudes of the signals represented by the vectors B and A-B are coupled to the load resistor 288, at which the two vectors are combined to produce a resultant signal which is represented by the vector A. Hence, with no phase error signal input to the burst phase control 44, the phase of the signal across the load resistor 288 is the same as the phase of the signal applied to the pin 40.

When the voltage on lead 254 is sufficiently more positive than the signal on lead 256, the transistor 282 is fully on and the transistor 290 is turned off, wherefore, the only signal developed across the load resistor 288 is that which is attributable to the current carried by the transistor 282. Under this condition, the voltage across the load resistor 288 is represented by the vector A-B. When the voltage on the lead 256 is sufficiently greater than the voltage on the lead 254, the opposite condition exists. That is, the transistor 290 conducts heavily, the transistor 282 is turned off, and the resultant voltage across the resistor 288 is represented by the vector B. Hence, by varying the voltage differential between leads 254 and 256, the voltage across the resistor 288 is varied over a phase range of 90°, as shown by the phase difference between the vectors B and A-B in FIG. 9.

It will be understood that the burst phase control 44 operates only on the VIR and standard color burst portions of the signals received at pins 40 and 42. Because the signal at those pins includes information other than color bursts, the control 44 is enabled, or gated on, by the burst gate 48 only during color burst intervals. At all other times, the burst gate 48 disables the burst phase control 44. The selective enabling and disabling of the control 44 is achieved in the following manner. The transistors 266 and 274, which supply operating current to the burst phase control 44, form one side of a differential amplifier, the other side of which is formed by transistors 294 and 296 in the burst gate 48. The latter transistors supply operating current to the chroma gain control 46. To provide a common source of current for this differential amplifier, the transistors 294 and 296 are coupled to a node 298 via emitter resistors 300 and 302. Likewise, the transistors 266 and 274 are coupled to the node 298 by emitter resistors 304 and 306. Also coupled to the node 298 is the collector of a current source transistor 308 which is biased by a diode-connected transistor 310 and a resistor 312 so that the transistor 308 supplies a constant current at the node 298. As described below, the transistors 266 and 274 are turned on to receive all the operating current from the node 298 during VIR and standard color burst intervals, and the transistors 294 and 296 are turned on at all other times. Hence, the burst phase control 44 is operative only during color burst intervals and the chroma gain control 46 is operative at all other times.

Selective turn on of the transistors 266 and 274 is achieved by altering the bias on those transistors relative to the bias on the transistors 294 and 296. For this purpose, the bases of the transistors 266 and 274 are coupled to a biasing network which includes a transistor 314 and resistors 316, 318, 320, 322, and 324. This biasing network may be selected to develop a voltage of about 5 volts at the emitter of transistor 314 and a voltage of about 4 volts at the bases of transistors 266 and 274. The voltage at the emitter of the transistor 314 is coupled via another resistor 326 to the bases of transistors 294 and 296. With this arrangement, transistors 294 and 296 are normally conductive and the transistors 266 and 274 on, the junction between the resistor 326 and the base of the transistor 294 (node 334) is coupled via a resistor 328 to the collector of a gating transistor 330. The emitter of this transistor is grounded and its base receives a burst gate pulse 332 for turning the transistor 330 on during each color burst interval. Hence, when the pulse 332 occurs, the voltage at node 334 is pulled low, thereby turning off the transistors 294 and 296. The resistor 326 isolates the low level at node 334 from transistors 266 and 274, wherefore the latter transistors now become conductive for enabling the burst phase control 44. When the burst gate 332 terminates, the voltage at node 334 rises again for enabling the transistors 294 and 296, thereby turning on the chroma gain control 46 and turning off the burst phase control 44.

The burst gate 48 also includes a network for coupling a biasing voltage via a lead 336 to the base of the transistor 272 and to the bases of additional transistors in the gain control 46. This network includes a pair of transistors 338 and 340 and their associated resistors. The emitter of the transistor 340 is coupled via a lead 342 to the pin 40 for sensing the D.C. component of the signal at that pin so as to develop an appropriate bias voltage on the lead 336.

referring now to the chroma gain control 46, this circuitry includes a first differential amplifier comprising transistors 344 and 346, a second differential amplifier comprising transistors 348 and 350, a third differential amplifier comprising transistors 352 and 354, and a fourth differential amplifier comprising transistors 356 and 358. The color signal input to this circuit is applied to the base of the transistor 344 via a lead 360, the transistor 258, and the input pin 40. Hence, the signal output of the differential amplifier comprising transistors 344 and 346 appears at the collector of the transistor 346 and is of the same phase as the signal input at the input pin 40. The collector of the transistor 346 feeds the emitters of transistors 352 and 354, the collector of the latter transistor being coupled to the load resistor 288.

The differential amplifier comprising transistors 348 and 350 and the differential amplifier comprising transistors 356 and 358 are included for varying the amplitude of the chroma signal present at the collector of the transistor 344 in response to an amplitude error signal, such that the D.C. voltage at the collector of the transistor 354 does not change as the amplitude errors signal changes. The bases of transistors 346, 348 and 350 are coupled to the lead 336 to receive an appropriate bias voltage. Operating current for transistors 348 and 350 is derived from the transistor 296, and operating current for transistors 344 and 346 is derived from the transistor 294. The emitter resistors 300 and 302 of these latter transistors are selected to be equal such that the transistors 294 and 296, when on, each carry one half the current developed by the transistor 308. The collector current of the transistor 348 is unused, but the collector current of transistor 350 is coupled to the emitters of transistors 356 and 358. The collector of the transistor 358 is coupled to the load resistor 288, whereas the collector current of transistor 356 is unused and is coupled to the positive voltage supply.

To control the amplitude of the VIR chrominance reference signal and the video chrominance which appears at the collector of the transistor 354, the bases of the transistors 352 and 358 are coupled to the lead 238, and the bases of transistors 354 and 356 are coupled to the lead 236. As stated previously, the leads 236 and 238 carry a differential amplitude error signal, and this signal is used to control the relative conduction of the transistors 352, 354, 356 and 358. In the case where the voltages on leads 236 and 238 are equal in amplitude (no amplitude error exists), the transistors 352 and 354 are equally conductive, and the transistor 354 develops, across the load resistor 288, a chrominance output which is equal in amplitude to the chrominance input at pin 40. Under this condition, the transistors 356 and 358 are also equally conductive, the output of the transistor 358 developing a D.C. voltage across the load resistor 288. An equal D.C. voltage is developed across the resistor 288 by the transistor 354, due to the fact that the D.C. current varied by transistors 354 and 358 are equal in amplitude.

When the voltage on lead 236 exceeds the voltage on the lead 238, the transistor 352 conducts less and the transistor 354 conducts more, wherefore the amplitude of the chrominance output across resistor 288 is increased. Simultaneously, the conduction level of transistor 358 decreases in order to hold substantially constant the D.C. voltage developed across the resistor 288. Conversely, when the voltage on lead 238 exceeds the voltage on lead 236, transistors 352 and 358 increase their conduction and transistors 354 and 356 decrease their conduction, thereby to decrease the amplitude of the chrominance signal across the load resistor 288 and to hold constant the D.C. component of that voltage.

With the above-described arrangement, the voltage developed across the resistor 288 includes phase corrected VIR color bursts and standard color bursts, and amplitude corrected VIR chrominance reference signals and video chrominance. The corrected signal is coupled to the output pin 102 via output transistors 362, 364 and 366.

One factor which is important about the characteristics of the signal at output pin 102 is that the amplitude ratio of chrominance to color burst should remain substantially constant when the chroma gain control 46 receives no differential amplitude error signal. This is partly achieved by insuring that the emitter degeneration resistors shown in the differential amplifiers of the control 46 are all of substantially equal value and by insuring that the transistors in the control 46 are matched to one another. The same precaution is taken with respect to the emitter degeneration resistors and the matching of transistors in the control 44. Nevertheless, when a phase error signal is applied to the control 44, the phase corrected color burst developed across the load resistor 288 may experience a small change in amplitude. However, the illustrated system compensates for such a change, as best explained by the following example. Assuming that the amplitude of the color bursts decreases at the pin 102, that decreases will be sensed by the ACC detector which is a part of the chroma IC. As best illustrated in FIG. 2, the ACC detector 16 receives the output of the VIR correction system and controls the gain of the first chroma amplifier 14 to hold the amplitude of the color burst at a substantially constant level. Hence, any decrease in the amplitude of the color burst at the output of the VIR correction system will be compensated by the ACC detector 16 increasing the gain of the first chroma amplifier 14. Thus, the color burst input to the VIR correction system will be brought back up to its original amplitude, but the amplitude of the VIR chrominance reference and the amplitude of the video chrominance will be increased due to the increased gain of the first chroma amplifier 14. However, an amplitude error signal is generated which causes the chroma gain control 46 to adjust its gain so that the amplitude of the VIR chrominance reference and the video chrominance are brought back down to their previous level. Hence, the burst to chrominance amplitude ratio is maintained constant despite burst amplitude variations caused by the operation of the burst phase control 44.

In view of the disclosure above, it will be appreciated that the present VIR correction system in adaptable for use in a wide variety of color television receivers. No special chroma processing circuitry is required, and the correction system allows all the usual chroma controls to operate normally. Moreover, the present correction system may also be incorporated in a broadcast system to control the phase and amplitude of the color components of the transmitted signal.

It will be obvious to those skilled in the art that many modifications and alterations may be made to the illustrated structure without departing from the invention. Accordingly, it is intended that all such modifications and alternations be included within the spirit and scope of the invention as defined by the appended claims.

What is claimed is:

1. In a system which processes a television signal which includes a plurality of video lines each having a standard color burst and video chrominance, and at least one line carrying a VIR signal composed of a VIR color burst and a VIR chrominance reference, a VIR correction system for automatically controlling the phase of the standard color burst and the amplitude of the video chrominance, comprising:

phase control means receiving at least the standard color burst portion of the television signal for correcting the phase of the standard color burst in response to a phase error signal;

gain control means receiving at least the video chrominance portion of the televison signal for correcting the amplitude of the video chrominance in response to an amplitude error signal;

an amplitude comparator receiving the VIR signal for sensing the amplitude reference between the VIR color burst and the VIR chrominance reference and for applying, to said gain control means, an amplitude error signal indicative of the sensed amplitude difference; and a phase comparator receiving the VIR signal for sensing the phase difference between the VIR color burst and the VIR chrominance reference and for applying, to said phase control means, a phase error signal indicative of the sensed phase difference.

2. A correction system as set forth in claim 1 for use in a television receiver having first and second chrominance amplifiers, wherein the video chrominance and color burst inputs to said gain and phase control means for derived from the first chrominance amplifier, and the color burst and video chrominance which are corrected by said gain and phase control means are input to said second chrominance amplifier.

3. A correction system as set forth in claim 2 wherein the input to said phase control means includes the standard color burst and the VIR color burst for correction of the phase of both burst inputs, wherein the input to said gain control means includes the video chrominance and the VIR chrominance reference for correction of the amplitude of both chrominance inputs, and wherein the outputs of said gain and phase control means constitute the inputs to said amplitude and phase comparators, thereby providing a closed loop correction system.

4. A correction system as set forth in claim 1 wherein said amplitude comparator includes a demodulator receiving the VIR signal for developing a demodulated VIR signal, detection means coupled to the output of the demodulator for detecting and storing signals representative of the amplitude of the demodulated VIR color burst and the demodulated VIR chrominance reference, and means for applying the difference between said stored signals, in the form of an amplitude error signal, to said gain control means.

5. A correction system as set forth in claim 4 wherein said demodulator receives the VIR signal, the standard color bursts and the video chrominance and develops demodulated outputs in response to each of its inputs, wherein said detection means includes a first sample and hold detector which is selectively gated on to detect and store a signal representative of the amplitude of the VIR chrominance reference and a second sample and hold detector which is selectively gated on to detect and store a signal representative of the amplitude of the VIR color burst.

6. A correction system as set forth in claim 1 wherein said phase comparator includes a demodulator receiving the VIR signal for developing outputs whose amplitudes are a function of their pre-demodulated phases relative to the phase of the VIR color burst, detection means coupled to the output of the demodulator for detecting and storing signals representative of the amplitude of the demodulated VIR color burst and the demodulated VIR chrominance reference, and means for applying the difference between said stored signals, in the form of a phase error signal, to said phase control means.

7. A correction system as set forth in claim 6 wherein said demodulator receives the VIR signal, the standard color bursts and the video chrominance, and develops demodulated outputs in response to each of its inputs, wherein said detection means includes one sample and hold detector which is selectively gated on to detect and store a signal representative of the phase of the VIR color burst and another sample and hold detector which is selectively gated on to select and store a signal representative of the phase of the VIR chrominance reference.

8. A correction system as set forth in claim 7 wherein the VIR signal further includes a luminance reference signal, and wherein said one sample and hold detector is gated on during the interval associated with the luminance reference signal.

9. In a television receiver which includes a first chrominance amplifier for receiving and amplifying a color signal comprising a VIR color burst, a VIR chrominance reference, standard color bursts and video chrominance, and which includes a second chrominance amplifier for further processing the television signal, a VIR correction system for automatically controlling the phase of the standard color burst and the amplitude of the video chrominance, comprising:

phase control means receiving the amplified color signal from the first chrominance amplifier for altering the phase of the standard color bursts and the VIR color burst in response to a phase error signal;

gain control means receiving the amplified color signal from the first chrominance amplifier for altering the amplitude of the video chrominance and the VIP chrominance reference in response to an amplitude error signal;

means for coupling the phase and amplitude altered outputs of said phase and gain control means to the input of the second chrominance amplifier;

a first demodulator for demodulating the phase and amplitude altered outputs of said phase and gain control means;

first detection means coupled to the output of said first demodulator for detecting and storing signals representative of the amplitude of the demodulated VIR color burst and the demodulated VIR chrominance reference;

means for sensing the difference between the signals stored by said first detection means and for applying, to said gain control means, an amplitude error signal representative of that difference;

a second demodulator for demodulating the phase and amplitude altered outputs of said phase and gain control means so as to develop demodulated outputs whose amplitudes are a function of their pre-modulated phases relative to the phase of the VIR color burst;

second detection means coupled to the output of said second demodulator for detecting and storing signals representative of the amplitude of the demodulated VIR color burst and the demodulated VIR chrominance reference; and means for sensing the difference between the signals stored by said second detection means and for applying, to said phase control means, a phase error signal representative of the latter sensed difference.

10. A correction system as set forth in claim 9 wherein the receiver includes an automatic phase control system receiving the phase altered color bursts for developing a 3.58 megahertz oscillator signal which is locked to the phase of the phase altered color bursts, and wherein said first demodulator receives the oscillator signal for in-phase demodulation.

11. A correction system as set forth in claim 10 wherein said second demodulator receives substantially quadrature phases of the oscillator signal for phasequadrature demodulation.

12. A correction system as set forth in claim 11 wherein said first detection means includes a first sample and hold detector adapted to be gated on during the chrominance reference interval for detecting and storing a signal representative of the amplitude of the VIR chrominance reference, and a second sample and hold detector adapted to be gated on to detect and store a signal representative of the amplitude of the VIR color burst.

13. A correction system as set forth in claim 11 wherein said second detection means includes a sample and hold detector adapted to be gated on for detecting and storing a signal representative of the phase of the VIR color burst and another sample and hold detector adapted to be gated on for detecting and storing a signal representative of the phase of the VIR chrominance reference.

* * * * *